United States Patent
Toyoda et al.

(10) Patent No.: US 8,194,999 B2
(45) Date of Patent: Jun. 5, 2012

(54) IMAGE GENERATING APPARATUS, IMAGE GENERATING METHOD AND COMPUTER PRODUCT

(75) Inventors: Yuushi Toyoda, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 12/457,809

(22) Filed: Jun. 22, 2009

(65) Prior Publication Data

US 2009/0268980 A1 Oct. 29, 2009

Related U.S. Application Data (63) Continuation of application No. PCT/JP2007/051456, filed on Jan. 30, 2007.

(51) Int. Cl.
G06K 9/40 (2006.01)
G06K 9/54 (2006.01)

(52) U.S. Cl. ........................... 382/274; 382/305

(58) Field of Classification Search .................. 382/168, 382/264, 274, 275, 305, 312, 167, 169, 254, 382/276; 358/1.9, 521, 3.21, 463; 347/15; 348/649, 671, 683
See application file for complete search history.

(56) References Cited

U.S. PATENT DOCUMENTS

| | | | | |
|---|---|---|---|---|
| 5,982,951 A * | 11/1999 | Katayama et al. | ............ | 382/284 |
| 6,081,344 A * | 6/2000 | Bockman et al. | ............ | 358/1.9 |
| 6,215,561 B1 * | 4/2001 | Kakutani | ............ | 358/1.9 |
| 6,384,895 B1 * | 5/2002 | Sawano | ............ | 355/40 |
| 6,954,556 B2 * | 10/2005 | Nou | ............ | 382/264 |
| 7,344,217 B2 * | 3/2008 | Kitamura et al. | ............ | 347/15 |
| 7,742,195 B2 * | 6/2010 | Kakutani | ............ | 358/3.13 |
| 7,911,540 B2 * | 3/2011 | Otani | ............ | 348/649 |

FOREIGN PATENT DOCUMENTS

| | | |
|---|---|---|
| JP | 10-303762 | 11/1998 |
| JP | 2000-101841 | 4/2000 |
| JP | 2000-511315 | 8/2000 |
| JP | 2002-304622 | 10/2002 |
| JP | 2005-312008 | 11/2005 |
| JP | 2006-026198 | 2/2006 |
| JP | 2006-26198 | 2/2006 |
| JP | 2006-238412 | 9/2006 |
| WO | 97/45809 | 12/1997 |
| WO | 2005/027042 A1 | 3/2005 |

OTHER PUBLICATIONS

Japanese Office Action issued on Jun. 1, 2010 in corresponding Japanese Patent Application 2008-557905.
International Search Report for International Application No. PCT/JP2007/051456, mailed May 15, 2007.

* cited by examiner

*Primary Examiner* — Kanjibhai Patel
(74) *Attorney, Agent, or Firm* — Fujitsu Patent Center (57) ABSTRACT

An image generating apparatus that generates an output image using a difference between an uncorrected pixel in an image and a smoothed pixel obtained by smoothing the uncorrected pixel. The image generating apparatus includes a storage unit, a tone-converted uncorrected pixel generating unit, a tone-converted smoothed pixel generating unit, and an output image generating unit. The storage unit stores an uncorrected pixel tone table for converting the uncorrected pixel and a smoothed pixel tone table for converting the smoothed pixel. The tone-converted uncorrected pixel generating unit converts the uncorrected pixel to a tone-converted uncorrected pixel based on the uncorrected pixel tone table. The tone-converted smoothed pixel generating unit converts the smoothed pixel to a tone-converted smoothed pixel based on the smoothed pixel tone table. The output image generating unit generates the output image based on a difference between the tone-converted uncorrected pixel and the tone-converted smoothed pixel.

3 Claims, 9 Drawing Sheets

| | TONE TABLE |
|---|---|
| UNCORRECTED PIXEL | f |
| SMOOTHED PIXEL | f' |

| UNCORRECTED PIXEL VALUE (I(x, y)) | | | | | |
|---|---|---|---|---|---|
| (x, 5) | 1 | 1 | 1 | 1 | 1 |
| (x, 4) | 1 | 1 | 1 | 1 | 1 |
| (x, 3) | 64 | 92 | 128 | 192 | 192 |
| (x, 2) | 256 | 256 | 256 | 256 | 256 |
| (x, 1) | 118 | 256 | 256 | 256 | 256 |
| (x, y) | (1, y) | (2, y) | (3, y) | (4, y) | (5, y) |

FIG.5A

| UNCORRECTED PIXEL VALUE (I(x, y)) | | | | | |
|---|---|---|---|---|---|
| (x, 5) | 1 | 1 | 1 | 1 | 1 |
| (x, 4) | 1 | 1 | 1 | 1 | 1 |
| (x, 3) | 64 | 92 | 128 | 192 | 192 |
| (x, 2) | 256 | 256 | 256 | 256 | 256 |
| (x, 1) | 118 | 256 | 256 | 256 | 256 |
| (x, y) | (1, y) | (2, y) | (3, y) | (4, y) | (5, y) |

FIG.5B

| SMOOTHED PIXEL VALUE (LPF(I(x, y))) | | | | | |
|---|---|---|---|---|---|
| (x, 5) | 10 | 10 | 10 | 10 | 10 |
| (x, 4) | 20 | 25 | 35 | 45 | 50 |
| (x, 3) | 74 | 100 | 128 | 154 | 172 |
| (x, 2) | 195 | 200 | 216 | 220 | 226 |
| (x, 1) | 120 | 198 | 226 | 226 | 226 |
| (x, y) | (1, y) | (2, y) | (3, y) | (4, y) | (5, y) |

FIG.6A

| UNCORRECTED PIXEL VALUE (I(x, y)) | | | | | |
|---|---|---|---|---|---|
| (x, 5) | 1 | 1 | 1 | 1 | 1 |
| (x, 4) | 1 | 1 | 1 | 1 | 1 |
| (x, 3) | 64 | 92 | 128 | 192 | 192 |
| (x, 2) | 256 | 256 | 256 | 256 | 256 |
| (x, 1) | 118 | 256 | 256 | 256 | 256 |
| (x, y) | (1, y) | (2, y) | (3, y) | (4, y) | (5, y) |

FIG.6B

| TONE-CONVERTED UNCORRECTED PIXEL VALUE (f(I(x, y))) | | | | | |
|---|---|---|---|---|---|
| (x, 5) | 5 | 5 | 5 | 5 | 5 |
| (x, 4) | 5 | 5 | 5 | 5 | 5 |
| (x, 3) | 84 | 110 | 140 | 200 | 200 |
| (x, 2) | 256 | 256 | 256 | 256 | 256 |
| (x, 1) | 125 | 256 | 256 | 256 | 256 |
| (x, y) | (1, y) | (2, y) | (3, y) | (4, y) | (5, y) |

FIG.7A

| SMOOTHED PIXEL VALUE (LPF(I(x, y))) ||||||
|---|---:|---:|---:|---:|---:|
| (x, 5) | 10 | 10 | 10 | 10 | 10 |
| (x, 4) | 20 | 25 | 35 | 45 | 50 |
| (x, 3) | 74 | 100 | 128 | 154 | 172 |
| (x, 2) | 195 | 200 | 216 | 220 | 226 |
| (x, 1) | 120 | 198 | 226 | 226 | 226 |
| (x, y) | (1, y) | (2, y) | (3, y) | (4, y) | (5, y) |

FIG.7B

| TONE-CONVERTED SMOOTHED PIXEL VALUE (f'(LPF(I(x, y)))) ||||||
|---|---:|---:|---:|---:|---:|
| (x, 5) | 80 | 80 | 80 | 80 | 80 |
| (x, 4) | 100 | 110 | 115 | 118 | 122 |
| (x, 3) | 126 | 128 | 136 | 165 | 158 |
| (x, 2) | 165 | 166 | 167 | 168 | 170 |
| (x, 1) | 132 | 165 | 170 | 170 | 170 |
| (x, y) | (1, y) | (2, y) | (3, y) | (4, y) | (5, y) |

FIG.8A

| TONE-CONVERTED UNCORRECTED PIXEL VALUE (f(I(x, y))) | | | | | |
|---|---|---|---|---|---|
| (x, 5) | 5 | 5 | 5 | 5 | 5 |
| (x, 4) | 5 | 5 | 5 | 5 | 5 |
| (x, 3) | 84 | 110 | 140 | 200 | 200 |
| (x, 2) | 256 | 256 | 256 | 256 | 256 |
| (x, 1) | 125 | 256 | 256 | 256 | 256 |
| (x, y) | (1, y) | (2, y) | (3, y) | (4, y) | (5, y) |

FIG.8B

| TONE-CONVERTED SMOOTHED PIXEL VALUE (f'(LPF(I(x, y)))) | | | | | |
|---|---|---|---|---|---|
| (x, 5) | 80 | 80 | 80 | 80 | 80 |
| (x, 4) | 100 | 110 | 115 | 118 | 122 |
| (x, 3) | 126 | 128 | 136 | 165 | 158 |
| (x, 2) | 165 | 166 | 167 | 168 | 170 |
| (x, 1) | 132 | 165 | 170 | 170 | 170 |
| (x, y) | (1, y) | (2, y) | (3, y) | (4, y) | (5, y) |

FIG.8C

| TONE-CONVERTED UNCORRECTED PIXEL VALUE − TONE-CONVERTED SMOOTHED PIXEL VALUE (f(I(x, y))−f'(LPF(I(x, y)))) | | | | | |
|---|---|---|---|---|---|
| (x, 5) | −75 | −75 | −75 | −75 | −75 |
| (x, 4) | −95 | −105 | −110 | −113 | −117 |
| (x, 3) | −42 | −18 | 4 | 35 | 42 |
| (x, 2) | 91 | 90 | 89 | 88 | 86 |
| (x, 1) | −7 | 91 | 86 | 86 | 86 |
| (x, y) | (1, y) | (2, y) | (3, y) | (4, y) | (5, y) |

FIG.8D

| OUTPUT PIXEL VALUE (O(x, y)) | | | | | |
|---|---|---|---|---|---|
| (x, 5) | 53 | 53 | 53 | 53 | 53 |
| (x, 4) | 33 | 23 | 18 | 15 | 11 |
| (x, 3) | 86 | 110 | 132 | 153 | 170 |
| (x, 2) | 219 | 218 | 217 | 216 | 214 |
| (x, 1) | 121 | 219 | 214 | 214 | 214 |
| (x, y) | (1, y) | (2, y) | (3, y) | (4, y) | (5, y) |

IMAGE GENERATING APPARATUS, IMAGE GENERATING METHOD AND COMPUTER PRODUCT

CROSS-REFERENCE TO RELATED APPLICATION(S)

This application is a continuation of PCT international application Ser. No. PCT/JP2007/051456 filed on Jan. 30, 2007 which designates the United States, incorporated herein by reference, the entire contents of which are incorporated herein by reference.

FIELD

The embodiments discussed herein is directed to an image generating apparatus, an image generating method, and a computer product.

BACKGROUND

In a digital image generating apparatus such as a digital camera, a digital video camera, a printer, and a display, a variety of image generating technologies have been known for generating output images based on the difference between uncorrected pixels, i.e., pixels to be corrected, in an input image and smoothed pixels obtained by smoothing the uncorrected pixels.

For example, Published Japanese Translation of PCT Application No. 2000-511315 discloses an image generating method called a "center/surround retinex" (hereinafter, a "retinex method") that models human visual characteristics by relatively compressing a dynamic range of the input image.

More particularly, the retinex method relatively compresses the dynamic range of an entire image by suppressing low frequency component read from the input image using a low-pass filter. Let I(x, y) denote each pixel value of the uncorrected pixels from the input image, which indicates brightness or luminance of each pixel and is represented by a numeric value ranging from 1 to 256 and let LPF(I(x, y)) denote each pixel value of the smoothed pixels, which is a low frequency component generated by the low-pass filter, then the retinex method outputs the output image having pixel values (O(x, y)) that are expressed as O(x, y)=log(I(x, y))−log(LPF(I(x, y))).

A more particular example is explained with reference to FIGS. 11A to 11H. FIGS. 11A to 11H are exemplary images and graphs for explaining a conventional image generating apparatus. In more detail, FIGS. 11B, 11C, 11E, 11F, and 11H are exemplary graphs having pixel values generated along a line A-B in FIG. 11A in an output image generating process on a vertical axis and pixel positions on a horizontal axis. FIG. 11D is a graph of a conventional tone table "f" having input values on the horizontal axis and output values obtained by converting the input values on the vertical axis.

Figure 11A:
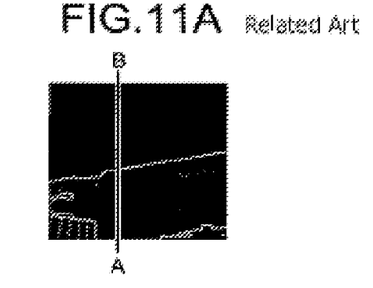
FIGS. 11A to 11H are example images and example graphs for explaining a conventional image generating apparatus.
Figure 11B:
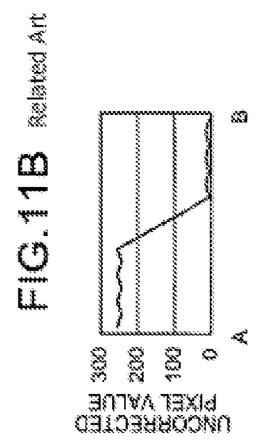
Figure 11C:
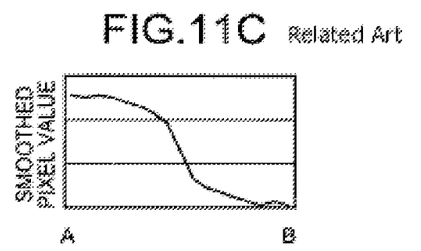
Figure 11D:
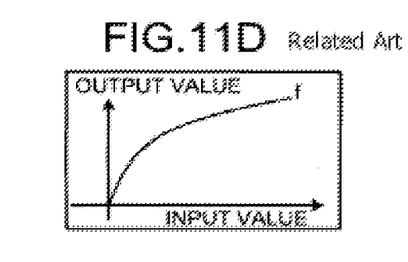
Figure 11E:
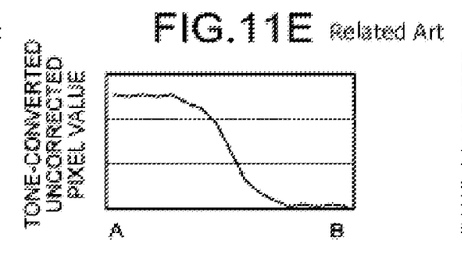
Figure 11F:
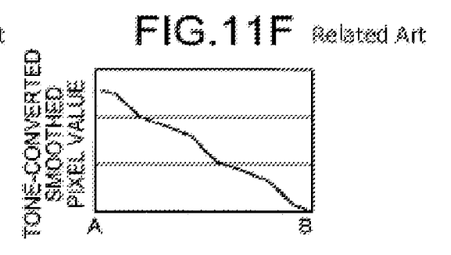
Figure 11G:
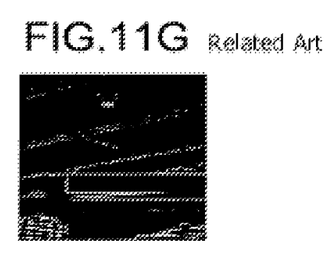
Figure 11H:
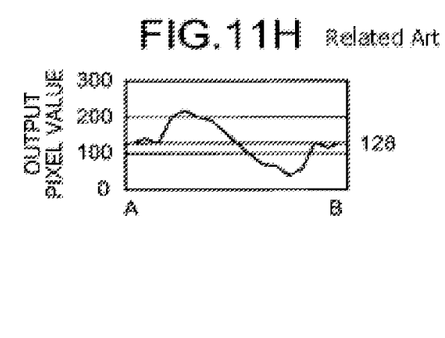

As illustrated in FIGS. 11A to 11H, the conventional image generating apparatus receives an input image, for example, the image illustrated in FIG. 11A, and then retrieves position information of each pixel and each uncorrected pixel at each pixel position from the input image, for example, as illustrated in FIG. 11B. Then, the conventional image generating apparatus generates the smoothed pixels from the uncorrected pixels using the low-pass filter, for example, as illustrated in FIG. 11C. In addition, the conventional image generating apparatus uses a tone table such as the table "f" illustrated in FIG. 11D to convert tone of each uncorrected pixel to generate each tone-converted input pixel, for example, as illustrated in FIG. 11E, as well as to convert the tone of each smoothed pixel to generate each tone-converted smoothed pixel, for example, as illustrated in FIG. 11F. The tone table is a substantially logarithmic table that converts the tone of each of the uncorrected pixels and the smoothed pixels. Then, the conventional image generating apparatus uses differences between the tone-converted uncorrected pixels and the tone-converted smoothed pixels as well as the tone-converted smoothed pixels to generate the output image, for example, as illustrated in FIGS. 11G and 11H. More particularly, the conventional image generating apparatus adds each difference between pixel values of the tone-converted uncorrected pixels and pixel values of the tone-converted smoothed pixels to a median pixel value of the uncorrected pixels, which is a value of 128 in the exemplary image illustrated in FIG. 11H, to generate the output image.

However, the conventional image generating apparatus generates images of degraded quality when the uncorrected pixels have high or low pixel values.

Explaining more particularly with reference to FIGS. 11A to 11H, the uncorrected pixels having higher pixel values (for example, a highlight portion near a point A) illustrated in FIG. 11A) and lower pixel values (for example, a shadow portion near a point B) illustrated in FIG. 11A) has relatively approximate pixel values in terms of the uncorrected pixels and the smoothed pixels, for example, as illustrated in FIGS. 11B and 11C. The resulting output images have pixel values on the highlight and shadow portions that are close to the median, for example, as illustrated in FIG. 11H, resulting in degradation of the output images (for example, see the highlight and shadow portions in FIG. 11G).

SUMMARY

According to an aspect of an embodiment, there is provided a computer readable storage medium comprising code for generating an output image based on a difference between an uncorrected pixel in an input image and a smoothed pixel obtained by smoothing the uncorrected pixel. The code, when executed, causes a computer to perform: a tone table storage unit storing an uncorrected pixel tone table that defines first conversion information for converting tone of the uncorrected pixel, and a smoothed pixel tone table that defines second conversion information different from the first conversion information for converting tone of the smoothed pixel; a tone-converted uncorrected pixel generating unit converting the tone of the uncorrected pixel to generate a tone-converted uncorrected pixel based on the uncorrected pixel tone table stored in the tone table storage unit; a tone-converted smoothed pixel generating unit converting the tone of the smoothed pixel to generate a tone-converted smoothed pixel based on the smoothed pixel tone table stored in the tone table storage unit; and an output image generating unit generating the output image based on a difference between the tone-converted uncorrected pixel generated by the tone-converted uncorrected pixel generating unit and the tone-converted smoothed pixel generated by the tone-converted smoothed pixel generating unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Exemplary embodiments of the invention is explained with reference to the accompanying drawings. The image generating apparatus according to the embodiments is described below as a digital image generating apparatus such as a digital camera, a digital video camera, a printer, or a display.

In the following, an overview and features of the image generating apparatus according to a first embodiment, each component included in the image generating apparatus, the operation of the image generating apparatus, and are explained.

Figure 1A:
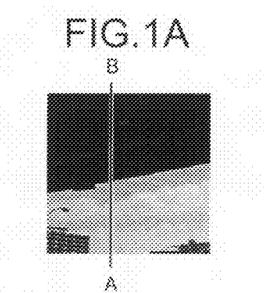
FIGS. 1A to 1H are example images and graphs for explaining an image generating apparatus according to a first embodiment.
Figure 1B:
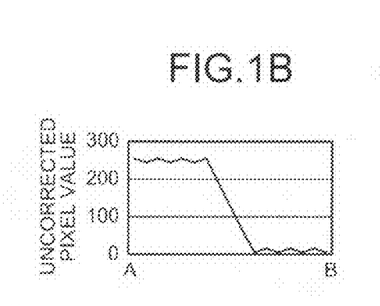
Figure 1C:
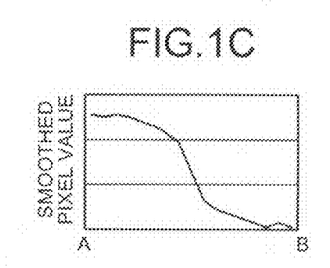
Figure 1D:
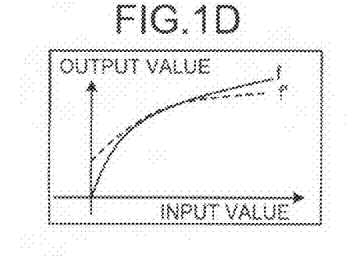

Referring to FIGS. 1A to 1H, the overview and features of the image generating apparatus according to the first embodiment are described. FIGS. 1A to 1H are exemplary images and graphs for explaining the overview and features of the image generating apparatus according to the first embodiment. More specifically, FIGS. 1B, 1C, 1E, 1F, and 1H are exemplary graphs having pixel values generated in an output image generating process along a line A-B illustrated in FIG. 1A on a vertical axis and pixel positions on a horizontal axis. FIG. 1D is a graph of tone tables "f" and "f" according to the first embodiment, which have input values on the horizontal axis and output values obtained by converting the input values on the vertical axis.

As illustrated in FIGS. 1A to 1H, the image generating apparatus according to the first embodiment, in short, generates an output image based on differences between uncorrected pixels, i.e., pixels to be corrected, in an input image and smoothed pixels obtained by smoothing the uncorrected pixels. In addition, the image generating apparatus according to the first embodiment is mainly characterized in that the output image is generated without degrading image quality.

More particularly, the image generating apparatus according to the first embodiment maintains an uncorrected pixel tone table that defines conversion information used to convert tone of the uncorrected pixels, and a smoothed pixel tone table that defines conversion information used to convert the tone of the smoothed pixels and being different from the conversion information defined in the uncorrected pixel tone table. In more detail, as illustrated in FIG. 1D, the uncorrected pixel tone table and the smoothed pixel tone table are defined and maintained such that pixels having low pixel values (those on a shadow portion) are converted to have higher pixel values as the smoothed pixels than as the uncorrected pixels, and contrary, pixels having high pixel values (those on a highlight portion) are converted to have higher pixel values as the uncorrected pixels than as the smoothed pixels.

In addition, the image generating apparatus according to the first embodiment receives an input image, for example, the image illustrated in FIG. 1A, and then retrieves position information of each pixel and each pixel value of the uncorrected pixel at each pixel position in the input image, for example, as illustrated in FIG. 1B. Each pixel value indicates brightness or luminance of each pixel and is represented by a numeric value ranging from 1 to 256. Then, the image generating apparatus generates the smoothed pixels from the uncorrected pixels using a low-pass filter, for example, as illustrated in FIG. 1C.

Then, the image generating apparatus according to the first embodiment uses the uncorrected pixel tone table to convert the tone of each uncorrected pixel to generate each tone-converted uncorrected pixel. The image generating apparatus also uses the smoothed pixel tone table to convert the tone of each smoothed pixel to generate a tone-converted smoothed pixel.

Figure 1E:
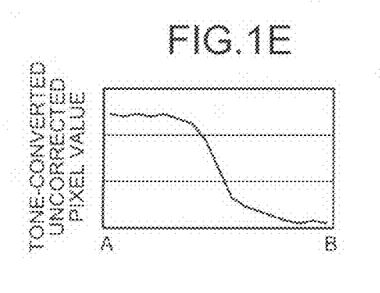
Figure 1F:
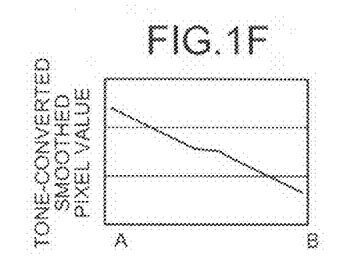

More particularly, as illustrated in FIG. 1E, the image generating apparatus according to the first embodiment uses the uncorrected pixel tone table "f" (illustrated in FIG. 1D) to convert the pixel values of the uncorrected pixels to pixel values of the tone-converted uncorrected pixels. Further, as illustrated in FIG. 1F, the image generating apparatus according to the first embodiment uses the smoothed pixel tone table "f'" (illustrated in FIG. 1D) to convert the pixel values of the smoothed pixels to pixel values of the tone-converted smoothed pixels.

Figure 1G:
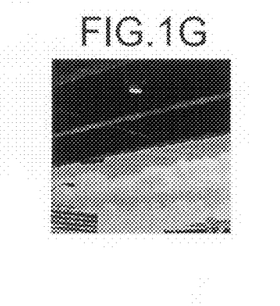
Figure 1H:
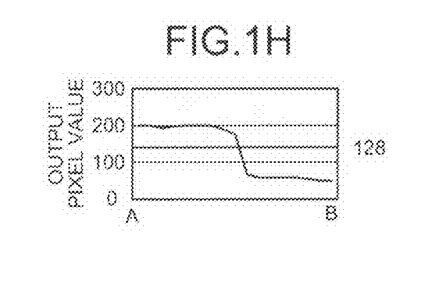

Then, the image generating apparatus according to the first embodiment uses the differences between the tone-converted uncorrected pixels and the tone-converted smoothed pixels to generate the output image, for example, as illustrated in FIGS. 1G and 1H. The conventional image generating apparatus applies the same tone table for the tone table that converts the tone of the uncorrected pixels and for the tone table that converts the tone of the smoothed pixels. Therefore, the differences obtained on the highlight and shadow portions tends to be small, and thus, the resulting output image tends to have pixel values that are about a median pixel value that is close to a value of 128 (illustrated in FIG. 1H). Contrary, the image generating apparatus according to the first embodiment applies different tone tables for the tone table that converts the tone of the uncorrected pixels and for the tone table that converts the tone of the smoothed pixels. Therefore, the output image can be generated that has high pixel values on the "highlight portion" and low pixel values on the "shadow portion".

As stated above with respect to the main features above, the image generating apparatus according to the first embodiment can generate images without degrading image quality. More particularly, the image generating apparatus according to the first embodiment produces larger differences between the shadow and the highlight portions than those obtained in the conventional image generating apparatus, and thus, output images have pixel values that are not too close to the median pixel value on these portions. Therefore, the image generating apparatus according to the first embodiment can generate images without degrading image quality when using input image having any one of the shadow and the highlight portions or both.

Figure 2:
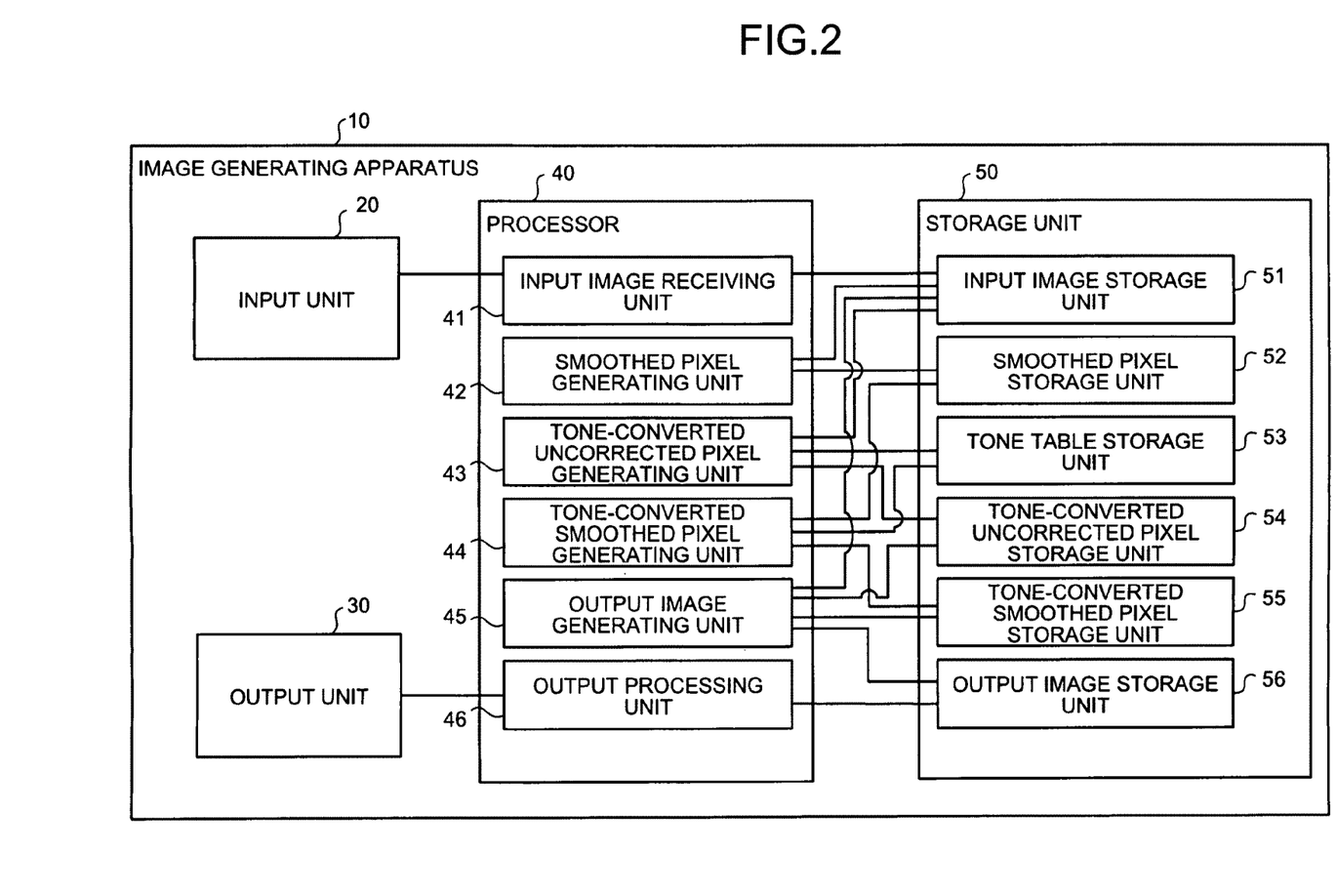
FIG. 2 is an example block diagram of the image generating apparatus according to the first embodiment.

Referring to FIG. 2, main components of the image generating apparatus according to the first embodiment are explained. FIG. 2 is a block diagram of the image generating apparatus according to the first embodiment. As illustrated in FIG. 2, an image generating apparatus 10 according to the first embodiment includes an input unit 20, an output unit 30, a processor 40, and a storage unit 50.

Figure 4A:
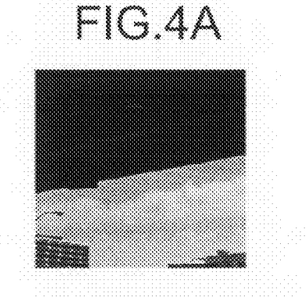
FIGS. 4A and 4B are an example image and an example table for explaining processing performed by an input image receiving unit illustrated in FIG. 2.

Among these components, the input unit 20 receives various information and various operation commands and corresponds to, for example, a jog dial or operation keys of a digital camera. Functions of the input unit 20 include receiving input image, for example, as illustrated in FIG. 4A, generated by a user digitally taking a photo and passing received information to the processor 40.

The output unit 30 outputs a variety of information and corresponds to, for example, a display of the digital camera, a touch panel, or a speaker. Functions of the output unit 30 include outputting resultant output images, for example, as illustrated in FIG. 8E to a display or the like to display the same.

The storage unit 50 stores therein data and programs that are required for various processes performed by the processor 40. The storage unit 50 includes, as illustrated in FIG. 2, an input image storage unit 51, a smoothed pixel storage unit 52, a tone table storage unit 53, a tone-converted uncorrected pixel storage unit 54, a tone-converted smoothed pixel storage unit 55, and an output image storage unit 56.

Figure 4B:
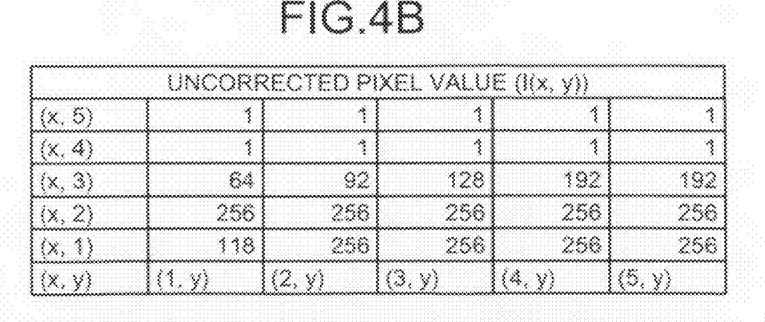

The input image storage unit 51 stores therein information related to the input image. More particularly, the input image storage unit 51 stores therein the input image, for example, as illustrated in FIG. 4A, received from an input image receiving unit 41. The input image includes the uncorrected pixels. More particularly, the input image storage unit 51 stores therein each uncorrected pixel (pixel value) at each pixel position in the input image received from the input image receiving unit 41 in association with position information of each uncorrected pixel, for example, as illustrated in FIG. 4B.

The smoothed pixel storage unit 52 stores therein information related to a smoothed image. More particularly, the smoothed pixel storage unit 52 stores therein each smoothed pixel (pixel value) at each pixel position that are generated by a smoothed pixel generating unit 42 in association with position information of each smoothed pixel, for example, as illustrated in FIG. 5B.

The tone table storage unit 53 stores therein the uncorrected pixel tone table defining conversion information used to convert the tone of the uncorrected pixels and the smoothed pixel tone table defining conversion information that is used to convert the tone of the smoothed pixels and is different from the conversion information defined in the uncorrected pixel tone table.

More particularly, the tone table storage unit 53 stores therein the uncorrected pixel tone table and the smoothed pixel tone table that are defined such that pixels having low pixel values are converted to have higher pixel values as the smoothed pixels than as the uncorrected pixels, and contrary, pixels having high pixel values are converted to have higher pixel values as the uncorrected pixels than as the smoothed pixels.

Figure 3A:
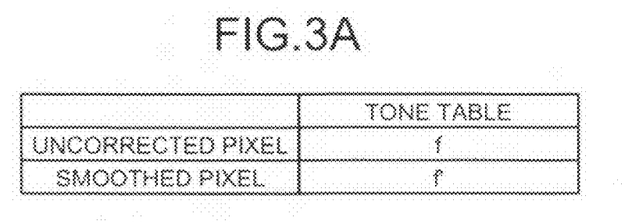
FIGS. 3A and 3B are an example tone table stored in a tone table storage unit illustrated in FIG. 2 and a graph thereof.
Figure 3B:
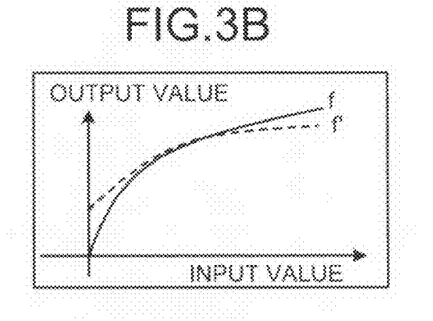

For example, as illustrated in FIGS. 3A and 3B, the tone table storage unit 53 stores therein the uncorrected pixel tone table "f" and the smoothed pixel tone table "f'" that are defined to convert the input values to the output values such that the low input values are converted to have higher output values in the table "f'" than those in the table "f" and the high input values are converted to have higher output values in the table "f" than those in the table "f'". The tone tables as used herein refer to tables that convert the tone of each input pixel and then output each pixel value of each tone-converted pixel. More particularly, the tone tables as used herein are functions that operationally process each input value to obtain each tone-converted output value. FIGS. 3A and 3B are tone tables stored in the tone table storage unit 53 illustrated in FIG. 2 and a graph thereof.

The tone-converted uncorrected pixel storage unit 54 stores therein information related to tone-converted uncorrected images. More particularly, the tone-converted uncorrected pixel storage unit 54 stores therein each tone-converted uncorrected pixel (pixel value) at each pixel position that is generated by a tone-converted uncorrected pixel generating unit 43 in association with position information of each tone-converted uncorrected pixel, for example, as illustrated in FIG. 6B.

The tone-converted smoothed pixel storage unit 55 stores therein information related to the tone-converted smoothed pixels. More particularly, the tone-converted smoothed pixel storage unit 55 stores therein each tone-converted smoothed pixel (pixel value) at each pixel position that is generated by a tone-converted smoothed pixel generating unit 44 in association with position information of each tone-converted smoothed pixel, for example, as illustrated in FIG. 7B.

The output image storage unit 56 stores therein information related to the output image. More particularly, the output image storage unit 56 stores therein each output pixel (pixel value) that is generated by an output image generating unit 45 in association with position information of each output pixel, for example, as illustrated in FIG. 8D. In addition, the output image storage unit 56 stores therein the output image generated by the output image generating unit 45, for example, as illustrated in FIG. 8E.

The processor 40 has an internal memory that stores therein programs defining various processing procedures and controlling data and performs a variety of processes using the programs and data. The processor 40 includes the input image receiving unit 41, the smoothed pixel generating unit 42, the tone-converted uncorrected pixel generating unit 43, the tone-converted smoothed pixel generating unit 44, the output image generating unit 45, and an output processing unit 46.

The input image receiving unit 41 receives the input image. More particularly, the input image receiving unit 41 receives the input image from the input unit 20 and stores the received input image in the input image storage unit 51. Then, the input image receiving unit 41 retrieves horizontal position information "x" in the input image and vertical position information "y" in the input image. Then, the input image receiving unit 41 stores the position information represented by "(x, y)" of each pixel in the input image storage unit 51 in association with each pixel value "I (x, y)" of corresponding uncorrected pixel at the pixel position.

As an example, as illustrated in FIGS. 4A and 4B, the input image receiving unit 41 receives the input image from the input unit 20 (see FIG. 4A) and stores the received input image in the input image storage unit 51. Then, as illustrated in FIG. 4B, the input image receiving unit 41 stores the position information (e.g., (1,1), (1,2), . . . (3,2), (3,3), . . . ) of each pixel in the input image in the input image storage unit 51 in association with the pixel value (e.g., 118, 256, . . . , 256, 128, . . . ) of corresponding uncorrected pixel at each pixel position. FIGS. 4A and 4B are an exemplary image and an exemplary table for explaining processing performed by the input image receiving unit 41.

The smoothed pixel generating unit 42 generates the smoothed pixels base on the uncorrected pixels. More particularly, the smoothed pixel generating unit 42 retrieves each pixel value "I (x, Y)" of the uncorrected pixel at each pixel position from the input image storage unit 51. Then, the smoothed pixel generating unit 42 generates each pixel value "LPF (I(x, y))" of the smoothed pixel at each pixel position in the smoothed image using a low-pass filter based on the pixel value of the uncorrected pixel at each pixel position and stores each pixel value "LPF (I(x, y))" of the smoothed pixel in the smoothed pixel storage unit 52 in association with corresponding position information "(x, y)".

Figure 5A:
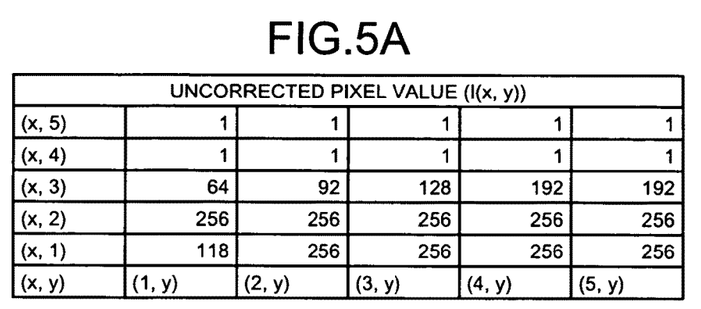
FIGS. 5A and 5B are example tables for explaining processing performed by a smoothed pixel generating unit illustrated in FIG. 2.
Figure 5B:
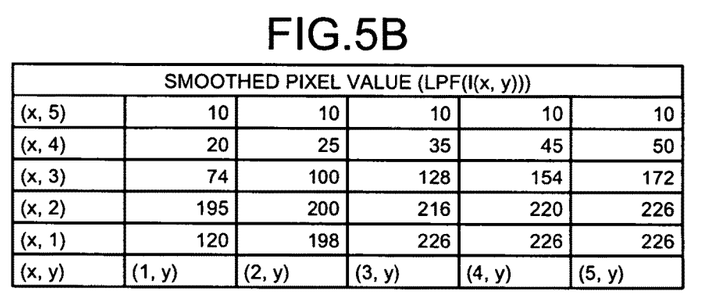

As an example, as illustrated in FIGS. 5A and 5B, the smoothed pixel generating unit 42 retrieves the pixel value (e.g., 118, 256, ..., 256, 128, ..., see FIG. 5A) of the uncorrected pixel at each pixel position and then convolves the pixel value of the smoothed pixel at each pixel position using the low-pass filter such as a filter table "W" including three rows and three columns. The convolution operation is represented by "*". As an example, the pixel value of the smoothed pixel obtained by smoothing the uncorrected pixel at pixel position (3,2) is I(x, y)*W=LPF(I(3,2))=216. Then, the smoothed pixel generating unit 42 stores the pixel value (e.g., 120, 195, ..., 216, 128, ..., see FIG. 5B) of the smoothed pixel at each pixel position in the smoothed pixel storage unit 52. FIGS. 5A and 5B are exemplary tables for explaining processing performed by the smoothed pixel generating unit 42 illustrated in FIG. 2.

The tone-converted uncorrected pixel generating unit 43 uses the uncorrected pixel tone table stored in the tone table storage unit 53 to convert the tone of the uncorrected pixels to generate the tone-converted uncorrected pixels. More particularly, the tone-converted uncorrected pixel generating unit 43 retrieves the pixel value of the uncorrected pixel at each pixel position stored in the input image storage unit 51 and the uncorrected pixel tone table stored in the tone table storage unit 53. Then, the tone-converted uncorrected pixel generating unit 43 uses the uncorrected pixel tone table to convert the tone of the uncorrected pixel at each pixel position to generate the pixel value "f(x, y)" of the tone-converted uncorrected pixel at each pixel position and then stores the pixel value "f(x, y)" in the tone-converted uncorrected pixel storage unit 54 in association with corresponding position information "(x, y)".

Figure 6A:
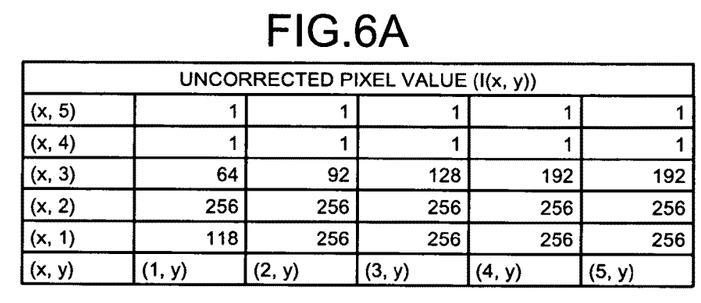
FIGS. 6A and 6B are example tables for explaining processing performed by a tone-converted uncorrected pixel generating unit illustrated in FIG. 2.
Figure 6B:
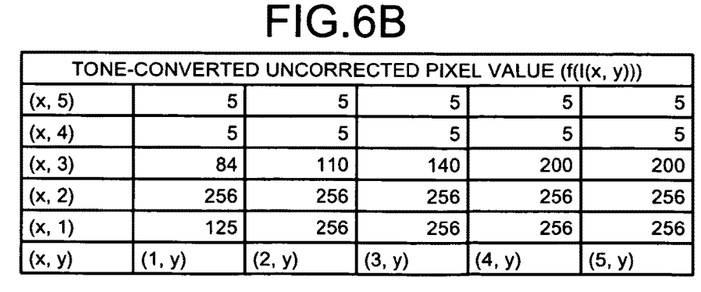

As an example, as illustrated in FIGS. 6A and 6B, the tone-converted uncorrected pixel generating unit 43 retrieves the pixel value (e.g., 118, 256, ..., 256, 128, ..., see FIG. 6A) of the uncorrected pixel at each pixel position and the uncorrected pixel tone table "f" (see FIG. 3A). Then, the tone-converted uncorrected pixel generating unit 43 uses the uncorrected pixel tone table to convert tone of the uncorrected pixel at each pixel position to generate the pixel value of the tone-converted uncorrected pixel at each pixel position. As an example, the tone-converted uncorrected pixel generating unit 43 converts the tone of the uncorrected pixel at the pixel position (3,2) to the pixel value f(I(3,2))=256 of the tone-converted uncorrected pixel using the tone table "f". Then, the tone-converted uncorrected pixel generating unit 43 stores the pixel value (e.g., 125, 256, ..., 256, 140, ..., see FIG. 6B) of the tone-converted uncorrected pixel at each pixel position in the tone-converted uncorrected pixel storage unit 54. FIGS. 6A and 6B are exemplary tables for explaining processing performed by the tone-converted uncorrected pixel generating unit 43 illustrated in FIG. 2.

The tone-converted smoothed pixel generating unit 44 uses the smoothed pixel tone table stored in the tone table storage unit 53 to convert the tone of each smoothed pixel to generate the tone-converted smoothed pixel. More particularly, the tone-converted smoothed pixel generating unit 44 retrieves the pixel value of the smoothed pixel at each pixel position from the smoothed pixel storage unit 52 and the smoothed pixel tone table stored in the tone table storage unit 53. Then, the tone-converted smoothed pixel generating unit 44 uses the smoothed pixel tone table to convert tone of the smoothed pixel at each pixel position to generate the pixel value "f' (LPF(I(x, y)))" of the tone-converted smoothed pixel at each pixel position and then stores the pixel value "f' (LPF(I(x, y)))" in the tone-converted smoothed pixel storage unit 55 in association with corresponding position information "(x, y)".

Figure 7A:
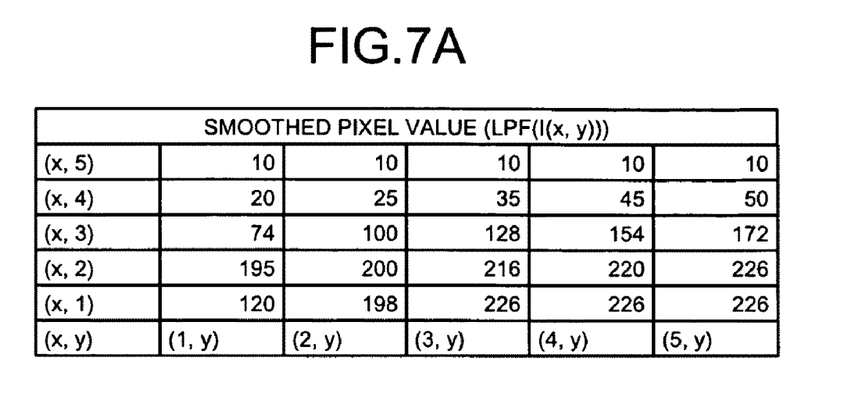
FIGS. 7A and 7B are example tables for explaining processing performed by a tone-converted smoothed pixel generating unit illustrated in FIG. 2.
Figure 7B:
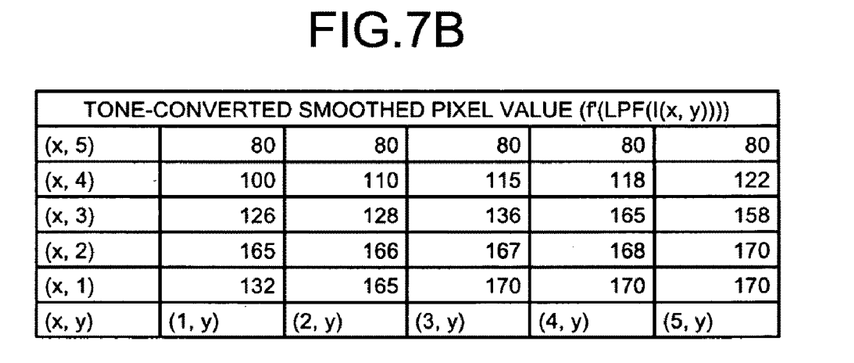

As an example, as illustrated in FIGS. 7A and 7B, the tone-converted smoothed pixel generating unit 44 retrieves the pixel value (e.g., 120, 195, ..., 216, 128, ..., see FIG. 7A) of the smoothed pixel at each pixel position and the smoothed pixel tone table "f'" (see FIG. 3A). Then, the tone-converted smoothed pixel generating unit 44 uses the smoothed pixel tone table to convert the tone of the smoothed pixel at each pixel position to generate the pixel value of the tone-converted smoothed pixel at each pixel position. As an example, the tone-converted smoothed pixel generating unit 44 converts the tone of the smoothed pixel at the pixel position (3,2) to the pixel value f' (LPF(I(3,2)))=167 of the tone-converted smoothed pixel using the tone table "f'". Then, the tone-converted smoothed pixel generating unit 44 stores the pixel value (e.g., 132, 165, ..., 167, 136, ..., see FIG. 7B) of the tone-converted smoothed pixel at each pixel position in the tone-converted smoothed pixel storage unit 55. FIGS. 7A and 7B are exemplary tables for explaining processing performed by the tone-converted smoothed pixel generating unit 44 illustrated in FIG. 2.

The output image generating unit 45 uses differences between tone-converted uncorrected pixels generated by the tone-converted uncorrected pixel generating unit 43 and tone-converted smoothed pixels generated by the tone-converted smoothed pixel generating unit 44 to generate each output image. More particularly, the output image generating unit 45 retrieves the pixel value of the tone-converted uncorrected pixel at each pixel position from the tone-converted uncorrected pixel storage unit 54 and the pixel value of the tone-converted smoothed pixel at each pixel position from the tone-converted smoothed pixel storage unit 55. The output image generating unit 45 generates each difference between pixel values of the tone-converted uncorrected pixels and pixel values of the tone-converted smoothed pixels at each pixel position. Then, the output image generating unit 45 adds the median pixel value of the uncorrected pixels to each difference between pixel values of the tone-converted uncorrected pixels and pixel values of the tone-converted smoothed pixels at each pixel position to generate each pixel value "O(x, y)" of each output image. Then, the output image generating unit 45 stores each pixel value "O(x, y)" in the output image storage unit 56 in association with corresponding position information "(x, y)". In addition, the output image generating unit 45 uses the pixel value of the output pixel at each pixel position and the input image to generate and store each output image in the output image storage unit 56.

Figure 8A:
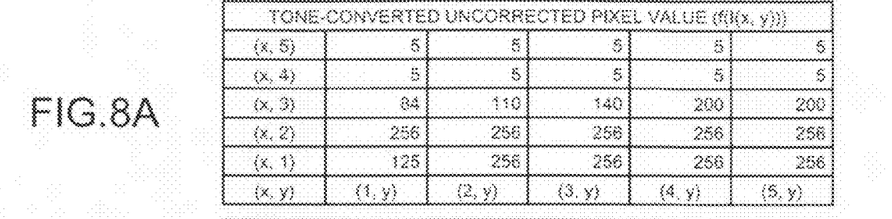
FIGS. 8A to 8E are example tables and an example image for explaining processing performed by an output image generating unit illustrated in FIG. 2.
Figure 8B:
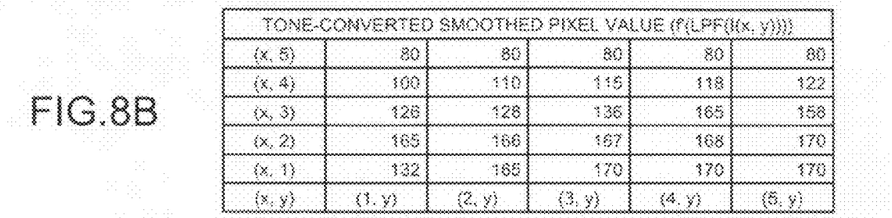
Figure 8C:
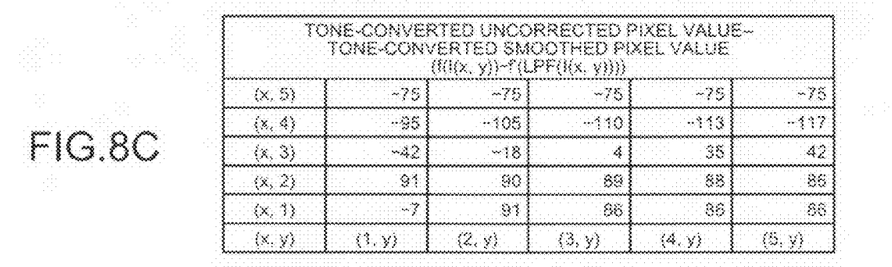
Figure 8D:
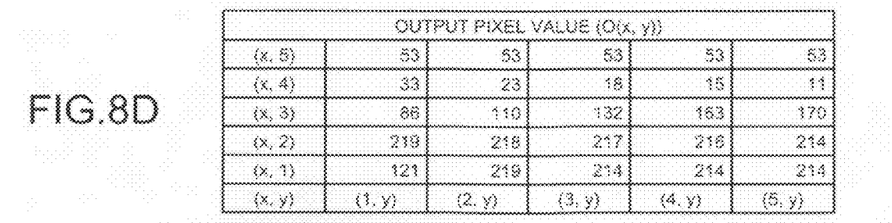
Figure 8E:
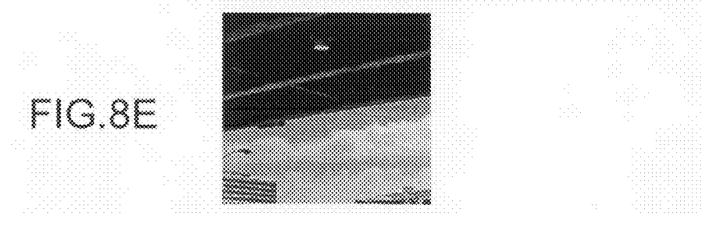

As an example, as illustrated in FIGS. 8A to 8E, the output image generating unit 45 retrieves the pixel value (e.g., 125, 256, ..., 256, 140, ..., see FIG. 8A) of the tone-converted uncorrected pixel at each pixel position and the pixel value (e.g., 132, 165, ..., 167, 136, ..., see FIG. 8B) of the tone-converted smoothed pixel at each pixel position. Then, the output image generating unit 45 generates each difference between pixel values of the tone-converted uncorrected pixels and pixel values of the tone-converted smoothed pixels at each pixel position. As an example, each difference between pixel values of the tone-converted uncorrected pixels and pixel values of the tone-converted smoothed pixels at the pixel position (3,2) is f(I(3,2))−f'(LPF(I(3,2)))=89 as illustrated in FIG. 8C. Then, the output image generating unit 45 adds the median pixel value of the uncorrected pixels, which is a value of 128 in the present example, to each difference between pixel values of the tone-converted uncorrected pixels and pixel values of the tone-converted smoothed pixels at each pixel position to generate each pixel value "O(x, y)" of each output image. As an example, the pixel value of the output pixel at the pixel position (3,2) is O(3,2)=f(I(3,2))−f' (LPF(I(3,2)))+128=217, for example, as illustrated in FIG. 8D. Then, the output image generating unit 45 stores the pixel value (e.g., 121, 219, . . . , 217, 132, . . . , see FIG. 8D) of output pixel at each pixel position in the output image storage unit 56 in association with corresponding position information (x, y). Then, the output image generating unit 45 uses the pixel value of the output pixel at each pixel position and each input image received from the input image storage unit 51 to generate and store the each output image in the output image storage unit 56, as illustrated in FIG. 8E. FIGS. 8A to 8E are exemplary tables and an exemplary image for explaining processing performed by the output image generating unit 45 illustrated in FIG. 2.

The output processing unit 46 performs a process to display the output image. More particularly, the output processing unit 46 retrieves the output image from the output image storage unit 56 and displays the output image, for example, as illustrated in FIG. 8E, on a display or the like via the output unit 30.

Figure 9:
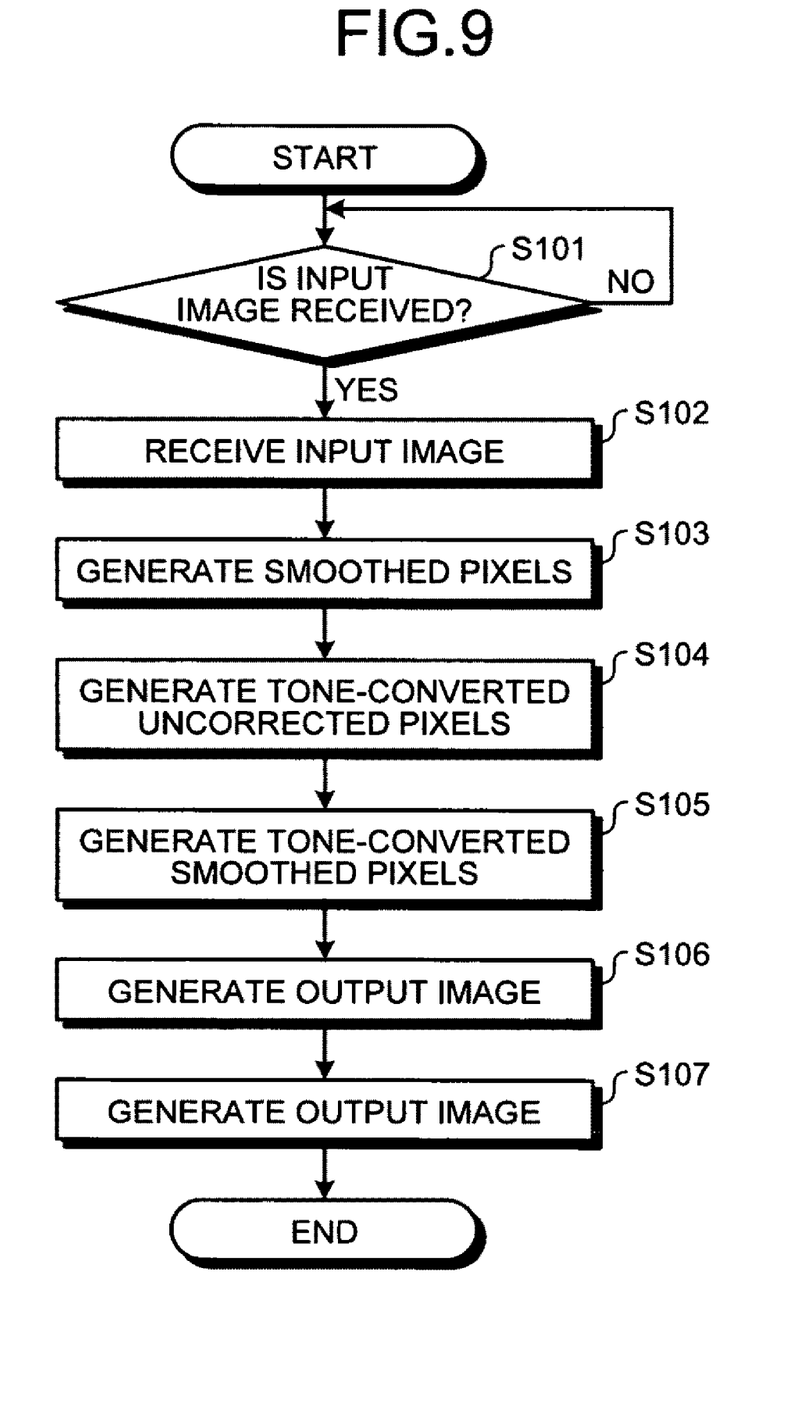
FIG. 9 is a flowchart of the operation of the image generating apparatus illustrated in FIG. 2.

Referring to FIG. 9, the processing performed by the image generating apparatus according to the first embodiment is described. FIG. 9 is a flowchart of the operation of the image generating apparatus according to the first embodiment.

As illustrated in FIG. 9, if a user inputs an image to the image generating apparatus 10 (YES at Step S101), the input image receiving unit 41 receives the input image via the input unit 20 (Step S102). More particularly, if the input image receiving unit 41 receives the input image from the input unit 20, the input image receiving unit 41 stores the input image and the pixel values of the uncorrected pixels in the input image storage unit 51.

The smoothed pixel generating unit 42 uses the uncorrected pixels to generate the smoothed pixels (Step S103). More particularly, the smoothed pixel generating unit 42 retrieves the uncorrected pixel at each pixel position from the input image storage unit 51, generates pixel value of the smoothed pixel at each pixel position therefrom, and stores the resultant each pixel value in the smoothed pixel storage unit 52.

The tone-converted uncorrected pixel generating unit 43 uses the uncorrected pixel tone table maintained in the tone table storage unit 53 to convert tone of each uncorrected pixel to generate each tone-converted uncorrected pixel (Step S104). More particularly, the tone-converted uncorrected pixel generating unit 43 retrieves the pixel value of the uncorrected pixel at each pixel position from the input image storage unit 51 and the uncorrected pixel tone table stored in the tone table storage unit 53 and performs converting operation on the uncorrected pixels to generate and store the pixel values of the tone-converted uncorrected pixels in the tone-converted uncorrected pixel storage unit 54.

The tone-converted smoothed pixel generating unit 44 uses the tone tables stored in the tone table storage unit 53 to convert tone of the smoothed pixels to generate the tone-converted smoothed pixels (Step S105). More particularly, the tone-converted smoothed pixel generating unit 44 retrieves the pixel value of the smoothed pixel at each pixel position from the smoothed pixel storage unit 52 and the smoothed pixel tone table stored in the tone table storage unit 53 and performs converting operation on the smoothed pixels to generate and store the pixel values of the tone-converted smoothed pixel in the tone-converted smoothed pixel storage unit 55.

The output image generating unit 45 uses the differences between the tone-converted uncorrected pixels generated by the tone-converted uncorrected pixel generating unit 43 and the tone-converted smoothed pixel generated by the tone-converted smoothed pixel generating unit 44 to generate the output image (Step S106). More particularly, the output image generating unit 45 retrieves the pixel value of the tone-converted uncorrected pixel at each pixel position from the tone-converted uncorrected pixel storage unit 54 and the pixel value of the tone-converted smoothed pixel at each pixel position from the tone-converted smoothed pixel storage unit 55, generates and uses the differences therebetween to generate the pixel values of the output pixels and the output image. Then, the output image generating unit 45 stores the pixel values of the output pixels and the output image in the output image storage unit 56.

The output processing unit 46 displays the output image via the output unit 30 (Step S107) and the processing performed by the image generating apparatus 10 ends.

As described above, according to the first embodiment, the image generating apparatus maintains the uncorrected pixel tone table that defines conversion information used to convert tone of the uncorrected pixels, and the smoothed pixel tone table that defines conversion information used to convert tone of the smoothed pixels and containing different information from the conversion information defined in the uncorrected pixel tone table. The image generating apparatus uses the uncorrected pixel tone table to convert tone of each uncorrected pixel to generate each tone-converted uncorrected pixel, converts tone of each smoothed pixel to generate each tone-converted smoothed pixel, and uses each difference between tone-converted uncorrected pixels and tone-converted smoothed pixels to generate the output image. Therefore, because different conversion tables are used to convert tone of the uncorrected pixels and the smoothed pixels, the image can be generated without degrading image quality.

More specifically, according to the first embodiment, the uncorrected pixel tone table and the smoothed pixel tone table are defined and maintained such that pixels having low pixel values are converted to have higher pixel values as the smoothed pixels than as the uncorrected pixels and pixels having high pixel values are converted to have higher pixel values as the uncorrected pixels than as the smoothed pixels. Therefore, because large differences are obtained on the shadow and the highlight portions, and thus, the output pixels on those portions in the output image are not too close to about the median pixel value, the image can be generated without degrading image quality even when the input image includes any one of the shadow and the highlight portions or both.

The first embodiment described above may be modified in a variety of different ways. In the following, examples of modification of the first embodiment are described.

For example, while the first embodiment uses the low-pass filter to generate the smoothed image, it is nor se limited and any technique such as a linear filter may also be applied to smooth the input image.

In addition, the first embodiment adds the median pixel value of the uncorrected pixels to each difference between pixel values of the tone-converted uncorrected pixels and pixel values of the tone-converted smoothed pixels at each pixel position to generate the output image. However, it is not so limited and any value such as a value close to the median pixel value of the tone-converted smoothed pixels may also be added to each difference between pixel values of the tone-converted uncorrected pixels and pixel values of the tone-converted smoothed pixels at each pixel position to generate the output image.

Further, while the first embodiment uses the input image including the shadow and the highlight portions to generate the output image, it is not so limited and any input image such as including only the shadow portion or only the highlight portion may also be applied to generate the output image.

Of the processes described above, all or part of the processes explained as being performed automatically may be performed manually (e.g., to generate an image according to a command from a user), or all or part of the processes explained as being performed manually may be performed automatically with a known method. The processing procedures, the control procedures, specific names, and information including various data and parameters described above and illustrated in the drawings (e.g., information illustrated in FIGS. 3A to 8E and images illustrated in FIGS. 1A to 1H may be arbitrarily changed as required unless otherwise specified.

The constituent elements described above are functionally conceptual, and need not be physically configured as illustrated. In other words, the specific mode of dispersion and integration of the constituent elements is not limited to the ones illustrated in the drawings, and the constituent elements, as a whole or in part, may be divided or integrated either functionally or physically based on various types of loads or use conditions (e.g., in FIG. 2, the tone-converted uncorrected pixel generating unit may be integrated with the tone-converted smoothed pixel generating unit). All or any part of the processing functions performed by the devices may be realized by a central processing unit (CPU) and a program analyzed and executed by the CPU, or may be realized as hardware by wired logic.

Figure 10:
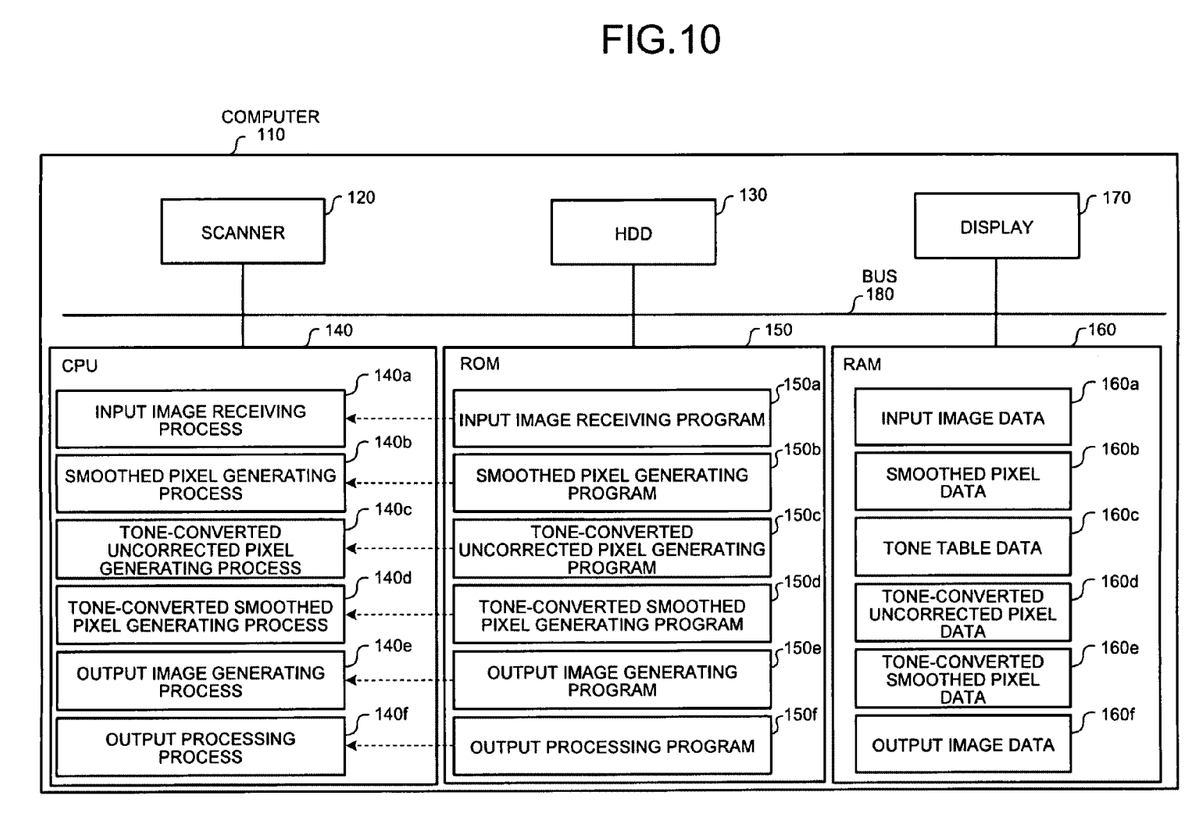
FIG. 10 is an example block diagram of a computer that executes an image generating program according to an embodiment of the present invention.

While the above embodiment implements various processes using hardware logic, they may be implemented by executing a computer program (hereinafter, "image generating program") on a computer. Referring to FIG. 10, a computer that executes the image generating program for implementing the same function as the image generating apparatus described and illustrated in the above embodiment is described. FIG. 10 is a schematic diagram of the computer that executes the image generating program.

As illustrated in FIG. 10, a computer 110 functioning as the image generating apparatus includes a scanner 120, a hard disk drive (HDD) 130, a CPU 140, a read-only memory (ROM) 150, a random access memory (RAM) 160, and a display 170, each of which is connected via a bus 180.

The ROM 150 stores the image generating program that implements the same function as the image generating apparatus 10 according to the first embodiment. Namely, as illustrated in FIG. 10, the ROM 150 stores in advance an input image receiving program 150a, a smoothed pixel generating program 150b, a tone-converted uncorrected pixel generating program 150c, a tone-converted smoothed pixel generating program 150d, an output image generating program 150e, and an output processing program 150f. As with the components of the apparatus illustrated in FIG. 2, these programs 150a to 150f may be integrated or distributed as appropriate.

The CPU 140 retrieves and executes these programs 150a to 150f from the ROM 150. As illustrated in FIG. 10, the programs 150a to 150f cause the CPU 140 to perform an input image receiving process 140a, a smoothed pixel generating process 140b, a tone-converted uncorrected pixel generating process 140c, a tone-converted smoothed pixel generating process 140d, an output image generating process 140e, and an output processing process 140f. The processes 140a to 140f correspond to the input image receiving unit 41, the smoothed pixel generating unit 42, the tone-converted uncorrected pixel generating unit 43, the tone-converted smoothed pixel generating unit 44, the output image generating unit 45, and the output processing unit 46 all illustrated in FIG. 2, respectively.

The CPU 140 executes the image generating program based on input image data 160a, smoothed pixel data 160b, tone table data 160c, tone-converted uncorrected pixel data 160d, tone-converted smoothed pixel data 160e, and output image data 160f stored in the RAM 160.

The programs 150a to 150f are not necessarily stored in the ROM 150 in advance. For example, the programs 150a to 150f may also be stored in a portable physical medium connectable to the computer 110 such as a flexible disk (FD), a CD-ROM, a DVD disk, a magneto-optical disk, or an integrated circuit (IC) card. Further, the programs 150a to 150f may also be stored in a fixed physical medium inside or outside the computer 110 such as an HDD, or in another computer or server connected to the computer 110 via a public line, the Internet, a local area network (LAN), a wide area network (WAN), or the like. In this case, the computer 110 reads the programs 150a to 150f from such a medium and executes them.

According to an embodiment of the present invention, images can be generated without degrading image quality.

Moreover, images can be generated without degrading image quality from input image having any one of the shadow and the highlight portions or both.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer readable storage medium comprising code for generating an output image based on a difference between a smoothed pixel and an uncorrected pixel in an input image, the smoothed pixel being obtained by smoothing the uncorrected pixel, the code, when executed, causing a computer to perform:

converting a tone of the uncorrected pixel to generate a tone-converted uncorrected pixel based on an uncorrected pixel tone table;

converting the tone of the smoothed pixel to generate a tone-converted smoothed pixel based on a smoothed pixel tone table different from the uncorrected pixel tone table, the smoothed pixel tone table defining that a pixel with a low pixel value is converted such that the smoothed pixel has a higher pixel value than the uncorrected pixel, and a pixel with a high pixel value is converted such that the smoothed pixel has a lower pixel value than the uncorrected pixel; and generating the output image based on a difference between the tone-converted uncorrected pixel and the tone-converted smoothed pixel.

2. An image generating apparatus that generates an output image based on a difference between a smoothed pixel and an uncorrected pixel in an input image, the smoothed pixel being obtained by smoothing the uncorrected pixel, the image generating apparatus comprising:

a tone table storage unit that stores therein an uncorrected pixel tone table, and a smoothed pixel tone table different from the uncorrected pixel tone table, the smoothed pixel tone table defining that a pixel with a low pixel value is converted such that the smoothed pixel has a higher pixel value than the uncorrected pixel, and a pixel with a high pixel value is converted such that the smoothed pixel has a lower pixel value than the uncorrected pixel;

a tone-converted uncorrected pixel generating unit that converts the tone of the uncorrected pixel to generate a tone-converted uncorrected pixel based on the uncorrected pixel tone table;

a tone-converted smoothed pixel generating unit that converts the tone of the smoothed pixel to generate a tone-converted smoothed pixel based on the smoothed pixel tone table; and an output image generating unit that generates the output image based on a difference between the tone-converted uncorrected pixel and the tone-converted smoothed pixel.

3. An image generating method for generating an output image based on a difference between a smoothed pixel and an uncorrected pixel in an input image, the smoothed pixel being obtained by smoothing the uncorrected pixel, the image generating method comprising:

converting a tone of the uncorrected pixel to generate a tone-converted uncorrected pixel based on an uncorrected pixel tone table;

converting the tone of the smoothed pixel to generate a tone-converted smoothed pixel based on a smoothed pixel tone table different from the uncorrected pixel tone table, the smoothed pixel tone table defining that a pixel with a low pixel value is converted such that the smoothed pixel has a higher pixel value than the uncorrected pixel, and a pixel with a high pixel value is converted such that the smoothed pixel has a lower pixel value than the uncorrected pixel; and generating the output image based on a difference between the tone-converted uncorrected pixel and the tone-converted smoothed pixel.

* * * * *